US006196614B1

(12) United States Patent
Willey

(10) Patent No.: US 6,196,614 B1
(45) Date of Patent: Mar. 6, 2001

(54) MOTORCYCLE WINDSHIELD MOUNT

(76) Inventor: Barry A. Willey, 727 Ela Rd., Inverness, IL (US) 60067

( * ) Notice: Subject to any disclaimer, the term of this patent is extended or adjusted under 35 U.S.C. 154(b) by 0 days.

(21) Appl. No.: 09/393,727

(22) Filed: Sep. 10, 1999

(51) Int. Cl.[7] .......... B62J 17/04
(52) U.S. Cl. .......... 296/78.1
(58) Field of Search .......... 296/78.1

(56) References Cited

U.S. PATENT DOCUMENTS

| | | | |
|---|---|---|---|
| 4,082,345 | 4/1978 | Willey . | |
| 4,168,098 | 9/1979 | Willey . | |
| 4,379,584 | 4/1983 | Willey . | |
| 4,489,973 | 12/1984 | Willey . | |
| 5,732,965 | 3/1998 | Willey . | |
| 5,788,313 | 8/1998 | Willey . | |
| 5,845,955 | 12/1998 | Willey . | |
| 5,988,727 * | 11/1999 | Mueller | 296/78.1 |

* cited by examiner

*Primary Examiner*—Joseph D. Pape
(74) *Attorney, Agent, or Firm*—James T. FitzGibbonn; Vedder, Price, Kaufman & Kammholz

(57) ABSTRACT

A windshield mounting assembly which includes a pair of mounting brackets, each of which includes preformed clamping formations having a plurality of slots or tabs and other complementary clamping formations having slots or tabs, with the slots and tabs interlocking to provide an area of attachment, with said clamps being adapted to encircle and grasp the downtubes of a motorcycle front suspension. Preferably, the assembly also includes vertical stiffeners and a horizontal stiffening member.

15 Claims, 1 Drawing Sheet

20
21
22
24
26
28
30
32
34
36
38
39
40
41
42
44
46
48
50
52
54
56
58
60
62
64
66
68
70
72
74
75
76
77
80
81
82
84
86
89
90
92
94
96
98
100
102
104
108
109
110
111
112
114

MOTORCYCLE WINDSHIELD MOUNT

BACKGROUND OF THE INVENTION

The present invention relates generally to motorcycle accessories, and more particularly to motorcycle windshields, especially those made at a low cost and featuring easy, reliable, sturdy installation.

The invention also relates to a low-cost motorcycle windshield having a novel structural support system which is simple to manufacture, install and which is adapted to fit a large number of cycles.

While a windshield is not strictly necessary to the operation of the motorcycle or a scooter, more and more large motorcycles are either delivered from the factory having windshields on them, or having windshields secured to them as an aftermarket accessory. In fact, for larger cycles, the motorcycle windshield or fairing is probably the most commonly purchased, relatively expensive accessory in the motorcycle industry. In the United States, and particularly in foreign countries, the advantages in having a windshield are becoming better and better known. It is now found increasingly more important by riders of small cycles to have motorcycle windshields on comparatively smaller cycles, such as, for example, those of 125 cc displacement. This market is served by all of the common Japanese manufacturers including not only Honda, Yamaha, Suzuki and Kawasaki, and other Oriental manufacturers such as Daelim, or Kyosung, but also by many European manufacturers, for example, Sachs.

One of the principal needs or requirements of a universal type windshield, —one that may be mounted on a large number of styles and models—is that the adjustable mounting features be adaptable to many styles, yet be strong and reliable. In other words, the shield should be as sturdy with larger forks as with smaller ones.

A significant number of the motorcycles that use ordinary, rather simply contoured windshields are mounted by a relatively simple system and that positions a one or two piece shield in front of the rider so as to afford a principal panel or see-through portion, and one or more lower panels that also serve as wind deflectors but extend downwardly toward the front fender and beneath the rider's line of sight.

The ordinary motorcycle windshield of this type has curves in at least one and usually two planes, and is supported by a structure which cantilevers the see-through or principal portion of the shield above a certain level. In such shields, in contrast to those wherein mounting legs are affixed to an upper portion of the shield, the mounting brackets and other shield positioners must be relatively strong in view of the fact that a large portion of the shield extends upwardly in a cantilevered or unsupported relationship above the midline of the shield. In many cases, 50–70% of the height of the shield lies above a line between the upper extent of a pair of generally vertically extending braces that serve to support the shield.

Normally, mounting brackets are affixed to the cycle by this lower portion and this upper end of the mount supports a transverse bar or brace to which the shield is secured. In some cases, fasteners only extend through the windshield into a rear brace, and in other cases, the shield, in effect, is sandwiched between opposed inner and outer braces.

For that portion of the motorcycle industry in which smaller cycles are sold having small displacement engines, for example, of approximately 125 cc or less, there have not been small windshields available which provide most or all the advantages of larger shields without their cost. In some cases, the bracing or mounting system requires the rest of the cycle to have a certain functional relation to the forks—which rules out the use of such shields on other applications. Other shields lack a desired degree of rigidity or horizontal adjustment.

In use, the shield need not have a totally rigid structure, inasmuch as it will not be exposed to more than comparatively moderate bending forces imposed by winds of 60 mph or more. As is well known, any failure of the shield mounting system can have serious consequences to the controllability of the motorcycle and the safety of the rider.

In view of the failure of the prior art to provide windshield assemblies and windshield mounting systems that are economical, sturdy and readily adaptable to a considerable range of sizes, it is an object of the present invention to provide an improved windshield and windshield mounting system.

It is another object of the invention to provide an improved mounting system for smaller sized, economical motorcycle windshields.

Yet another object of the invention to provide an economical cycle shield that is adaptable to many styles of cycles.

Still another object of the invention has been to provide a mounting system characterized by strength and ease of installation, and which is adaptable to various downtube sizes without itself being structurally different.

A further object of the invention is to provide a mounting system for a windshield that includes an adjustment feature so that the brackets may be spaced apart as desired, particularly where the mounting brackets are somewhat resilient.

An additional object of the invention is to provide a mounting system wherein the clamping elements further include gaskets to minimize damage to the forks and provide ready removability.

The foregoing and other objects and advantages of the invention are achieved in practice by providing a windshield mounting assembly which includes a pair of mounting brackets, each of which includes preformed, curvilinear clamping formations having a plurality of slots and other complementary clamping formations including a tab, with said tab and slots interlocking to provide an area of attachment, with said clamps being adapted to encircle and grasp the downtubes of a motorcycle front suspension.

The manner in which the foregoing and other objects and advantages of the invention are achieved in practice will become more clearly apparent when reference is made to the following detailed description of the preferred embodiments of the invention set forth by way of example and shown in the accompanying drawings wherein like reference numbers or legends indicate corresponding parts throughout.

DESCRIPTION OF THE PREFERRED EMBODIMENTS OF THE INVENTION

Figures 1, 2:
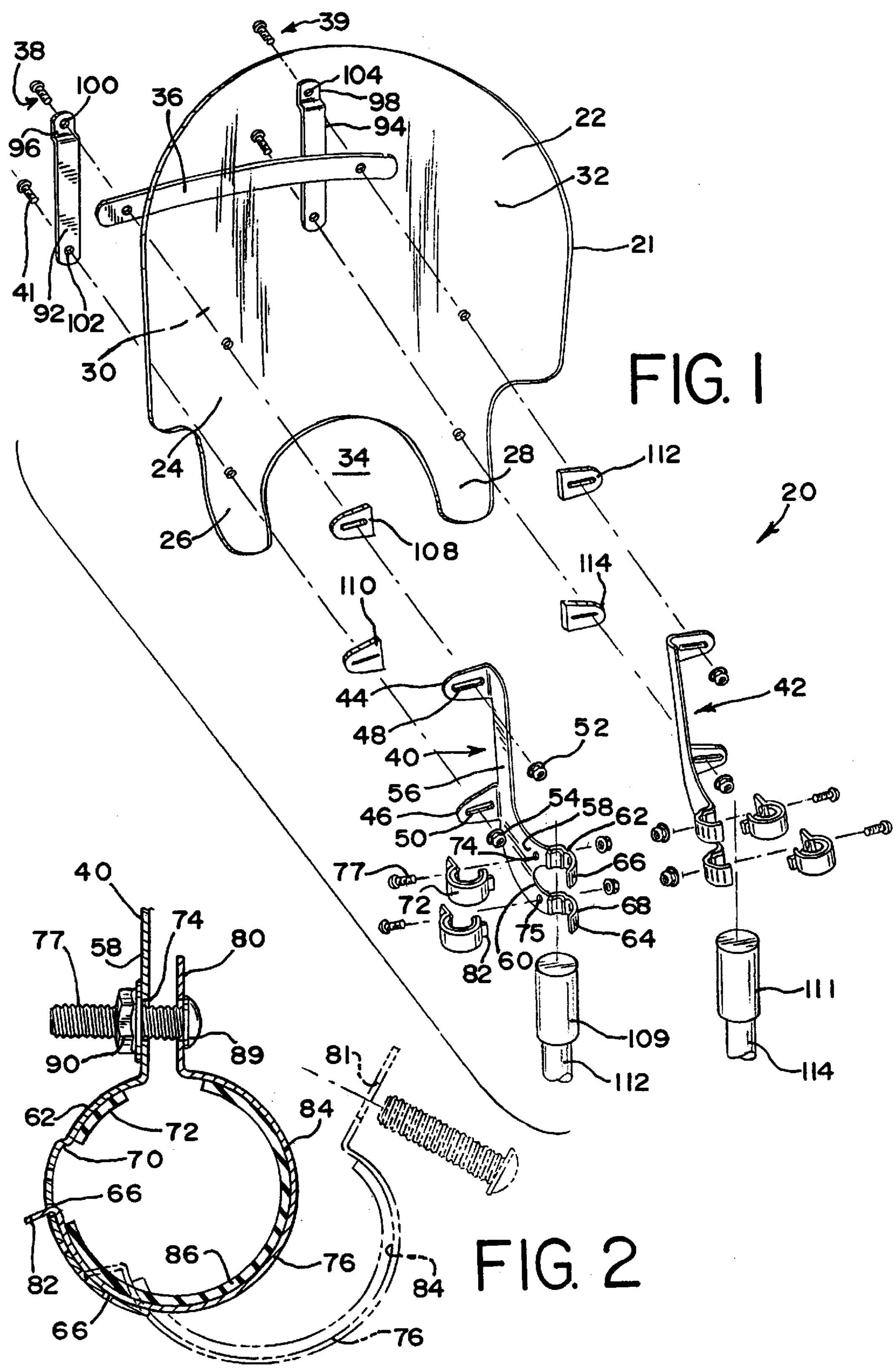
FIG. 1 is an exploded perspective view of a motorcycle windshield, showing the various components of the combination mounting and clamping assembly in spaced apart relation to one another and to the associated windshield.
FIG. 2 is a greatly enlarged plan view showing the clamping elements and the manner of positioning the elements and fasteners about the down tubes of a fork assembly, with phantom lines showing a typical open position just prior to installation on the cycle.

While the present invention is capable of a number of uses and may be the subject of various changes and modifications, a description will be given of a preferred form of apparatus, including the structure by which the shield is mounted to the braces, and the manner in which the braces mount to the fork tube assembly of the cycle.

Referring now to the drawings in greater detail, there is shown in FIG. 1 a windshield assembly generally designated 20 and shown to include a windshield 21 per se having an upper, see-through portion 22 and a lower mount-receiving portion generally designated 24, and shown to include left- and right-hand curvilinear transparent lower panels 26, 28. When the expression "left" or the like is used, the direction is intended to mean relative to the hand of a rider astride the motorcycle. Likewise, while the windshield mounting assembly of the invention may be positioned in various orientations, expressions such as "forward" or the like and "upper" and "lower" are intended to mean portions of the assembly having that orientation in relation to the motorcycle in normal use.

The windshield unit, generally designated 21, will be seen to have front and rear surfaces respectively designated 30, 32. According to the usual practice, the left- and right-hand lower panels 26, 28 define therebetween an open area 34, such as for receiving the headlight of an associated cycle. The windshield is functionally divided between the upper portion 22 and the lower portion 24 by a transverse, generally horizontally extending exterior front brace or support element 36 which is fastened through the shield 21 by fasteners generally designated 38, 39. The shield element 21 is partially sandwiched between this front brace or support element 36 and other elements to be described in detail herein.

In addition, as shown in FIG. 1, each of the lower side panels 26, 28 and the surrounding area has associated therewith a mounting assembly which includes mirror-image left- and right-hand brackets generally designated 40, 42. While the brackets 40, 42 are both shown in FIG. 1, only one bracket requires a detailed description for understanding the invention.

As shown in the drawing, the bracket 40 includes generally transversely extending ears 44, 46, with elongated, transverse slots 48, 50 for receiving plural fasteners 38, 41 therein. The fasteners, for example those shown at 38 and 41, have a rounded head and Allen or hexagonal sockets therein; the nuts 52, 54 are preferably flange nuts with integrally formed lock washer-like formations therein.

The bracket 40 also importantly includes a backbone or upright portion 56 extending between the ears 44, 46 and a lower, curved and enlarged width portion 58. At the free end 60 of the enlarged width portion 58 are two spaced apart, arcuate clamping formations 62, 64. These formations importantly include plural sets of slots 66, 68, and a slight offsetting-bend 70 to accommodate a pad 72 of elastomeric or other gasketing material. The arcuate formation has a radius such that it is sized approximately to the largest diameter of a downtube likely to be encountered, in the size range of this cycle, namely 40–42 mm. Openings 74, 75 for a fastener 77 are positioned in two end portions of the enlarged width portion 58 of the bracket 40.

The complementary clamping members 76 are of about the same curvature as their counterparts, but extend through a greater arc, say up to 270°. The complementary clamping members also include a fastening flange 80 with an opening 81 therein for the fastener 77 on one end and a tab 82 of reduced width at the other end. A major portion of the inside surface 84 of the complementary member 76 is also covered by a pad of elastomeric material 86 which serves as a gasket. The two units 62, 76 are secured to each other by a round headed fastener 77 with a hexagonal socket in its rounded head 89. A flange nut 90 with a built-in lock washer completes the assembly.

The attachment of the bracket or mounting member 40 to the shield 21 is completed by sandwiching the shield between a pair of flat sheets 92, 94 and the bracket ears 44, 46. The flat sheets 92, 94 are slightly curved in one dimension.

The flat sheets 92, 94 each include an offset portion 96, 98 and openings 100, 102, 104, 106. The flat sheets 92, 94 span the distance between the slots 48, 50 in the ears 44, 46. The ears 44, 46 and the flat sheets lie on opposite sides of the shield 21 and sandwich the shield between them. The upper transverse piece 36 lies directly on the shield 21 with the offset portions 96, 98 of the flat sheets lying on top of the transverse piece 36. The remainder of the flat sheets immediately overlie the shield 21. In addition, the unit is shown to include upper and lower gaskets 108, 110, 112, 114. The fasteners 38, 41 and the flange nuts 52, 54 hold the entire assembly together. The fasteners 39, 43 are joined by nuts 45, 47.

Referring now to the installation of the unit, the shield is assembled in a normal manner, that is with the front crosspiece 36 and the two flat sheets 92, 94 lying in place on the front of the shield 21 and the brackets 40, 42 lying on the rear side 32 of the shield 21. The units, including the gaskets and nuts, are tightened in sequence, and the result is a shield with the portions 56, 58 lying to the rear of the shield. Normally, the brackets are assembled in such a way that their curvilinear portions 66, lie laterally apart a distance just larger than the span between the two upper ends 109, 111 of the fork tubes 112, 114. At this point, the outwardly biased end portions may be pressed slightly together and placed in their desired relation to the upper ends 109, 111 of the fork tubes, where they will remain because of their innate resiliency. The complementary clamping portions 76 are placed with their locking tabs 82 engaged with an appropriate slot 66 with the fastening flange 80 open. As soon as the flanges partially encircle the upper portions 109, 111 of the fork tube, the complementary clamp is simply closed. At this point, the fastener 88 is inserted through the opening 81 and the nut 90 is tightened.

It is assumed, for this purpose, that the correct inside diameter, whether 41 or 42 mm, or 36 mm, etc. is selected. When the complementary clamps are secured in place over the fork tube upper portions 109, 111, the installation is complete. At this point, the gasketing material 72, 86 is also inherently positioned in place to avoid the effects of vibration and to secure the shield in place.

Another feature of the invention comprises the elongated slots 48, 50 in the ears 44, 46 of the bracket 40 and their counterparts on the right-hand brace 42. Also, the gasket materials 108, 110, 112, 114 contain lateral slots therein. In addition to being adjustable in size by reason of the different available clamping diameters, the brackets are adjustable as to their width by simply loosening the fasteners and sliding the brackets in either direction. Typically, an adjustment of about 2 inches of total movement are typically provided. The ideal practice is to adjust the brackets 40, 42 in such a way that, in their relaxed positions, the brackets lie just outwardly of their as-installed positions. This provides the inherent ability to place the brackets over the fork tube upper ends 109, 111 with a spring action, whereby the windshield will remain in place while the complementary clamps 76 are emplaced. Typically, about a ½" for each bracket 40, 42 is customary.

The brackets 40, 42 have been shown to terminate in two clamps, each separated by a space of an inch or so. These clamps obviously may be placed together without the space between them. However, normally a space is provided to accommodate headlight brackets or especially, turn signals. Also, the ears 46, 48 are depicted as lying outboard of the brackets 40, 42, but obviously they may be folded inwardly if desired for some reason.

Likewise, the one large clamp may have either one or two fasteners to complete the attachment. One or two sets of slots and tabs could be made accordingly. Certain of the braces are shown to lie on the front, and certain braces on the rear, of the shield. The preferred construction has been shown, but additional braces may be used, or in some cases, the braces shown may have their positions reversed as to the front and rear surfaces of the shield.

Referring now to the preferred materials from which the various components of the windshield assembly of the invention are made, and the method of making them, the shield 21 itself is preferably made from an acrylic material with or without a mar-resistant coating thereon. Typically, the acrylic is hard enough that a mar-resistant coating need not be used, but one may be imparted to the shield if it is felt necessary. The shield is cut to its outside dimensions with a router, for example, and then heated and formed to its final contours. In the alternative, a polycarbonate sheet material may be used, in which case the mar-resistant coating is more necessary. Other stiff, transparent materials known to those skilled in the art may also be used to form the shield.

The brackets, which include the backbone, the ears and the clamping portions are preferably stamped from 0.050" cold rolled steel, blanked, and then the ears are formed as are the curved portion comprising the partial clamps. Of course, other thicknesses may be used and suitable substitutions may be made. The finished product is preferably chrome plated for a decorative appearance and weather resistance, especially considering that the shield will be exposed to weather of all kinds.

The transverse front brace 38 is also made from 0.050" stock and preferably is 1 inch wide. The backbone portion 56 of the bracket 40 is about 1 inch wide, and the enlarged rear free end portion is approximately 3 inches wide. The complementary clamp 76 is made from the same material and both the tab found in this piece and the slots are about one-half inch wide. The flat sheets 92, 94 curved in one dimension only, are made from the same material, and are preferably 1 inch wide. The offset 96 in this piece gives clearance for the transverse front brace 38, so when the unit is assembled, the pieces are substantially flush. The gaskets 72, 86 are made from a neoprene material, even though other elastomers may be used.

The presently preferred combination of materials which affords attractiveness at reasonable cost has been described. However, the metal parts may be made from stainless steel, which adds expense but increases durability. A gold anodized finish may be placed on the brackets or, in the interest of economy, they may be merely painted black or other suitable color.

It will thus be seen that the present invention provides a new and improved windshield mounting apparatus and components thereof, having a number of advantages and characteristics including those expressly pointed out herein, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A motorcycle windshield assembly comprising, in combination, a shield portion having an upper portion to be seen through and a lower portion including a pair of generally vertically extending shield stiffening portions, said lower portion also receiving a pair of mounting brackets, each of said brackets including a pair of mounting ears, a backbone and a first pair of clamping units for at least partially encircling the downtube portions of an associated motorcycle front suspension, a pair of complementary clamping units adapted to cooperate with said first pair of clamping units so as to encircle the reminder of said downtube, one of said first pair of clamping units and complementary pair of clamping units including plural slots and the other including a tab receivable in said slot, said tab and slot permitting ready assembly, adjustment and disassembly of said unit, and fasteners for clamping each of said slotted parts and said tab-continuing parts together around said downtubes.

2. A motorcycle windshield assembly as defined in claim 1, which further includes an exterior front support element extending between the upper pair of ears on said brackets, said shield being sandwiched between said transverse front brace and said ears.

3. A motorcycle windshield assembly as defined in claim 1, wherein said mounting ears each includes a laterally elongated slot permitting adjustment of the distance between said mounting brackets.

4. A motorcycle windshield assembly as defined in claim 1, wherein said tabs are contained on said complementary clamping units and said slots are formed in said first pair of clamping units.

5. A motorcycle windshield assembly as defined in claim 1, which further includes gaskets disposed between said ears and said shield to assist in isolating said shield from vibration.

6. A motorcycle windshield assembly as defined in claim 1, wherein said first pair of clamping units partially encircles said downtube, said first pair of clamping units including an offset portion in said clamping units substantially equal to the thickness of a gasket portion included in said complementary clamping unit.

7. A motorcycle windshield assembly as defined in claim 1, wherein said complementary clamping unit includes an elastomeric pad serving as a gasket, said gasket being contained within substantially the entire curved portion of said complementary clamping unit.

8. A motorcycle windshield assembly as defined in claim 1, wherein said backbone and said stiffeners are decoratively chrome plated.

9. A motorcycle windshield assembly as defined in claim 1, wherein said shield is an acrylic sheet material.

10. A motorcycle windshield assembly as defined in claim 1, wherein said lower portion of said shield includes a cutout portion for a headlight, said cutout portion lying between said clamping units.

11. A motorcycle windshield assembly for attachment to a motorcycle with a front suspension having opposed downtubes forming a part of a front suspension assembly, said windshield assembly comprising, in combination, a windscreen portion made from a stiff, translucent material and including an upper section adapted to be viewed through and a lower screen portion receiving a pair of mounting elements, said pair of mounting elements comprising a pair of generally vertically extending stiffening portions and at least two mounting brackets, each of said brackets including a pair of mounting ears, a backbone portion connecting said ears to each other, and an enlarged width portion having a free end terminating in a first pair of partial clamping units for at least partially encircling the downtube portions of said associated motorcycle front suspension, and a pair of complementary clamping units adapted to cooperate with said first pair of partial clamping units so as to encircle substantially the remainder of said downtubes, one of said pair of clamping units including, in said encircling portion, a plurality of slots and said other clamping unit including, near one end, an offset tab adapted to engage a selected one of said slots to form a hinge point, said tab and slot permitting ready assembly, adjustment and disassembly of said unit, and fasteners for clamping the portion of said free end of said bracket near said slotted part to said portion of said complementary clamp lying remote from said tab together around said downtube.

12. A motorcycle windshield assembly as defined in claim 11, wherein said ears on said mounting brackets have laterally elongated openings therein, thereby permitting adjustment of the distance between mounting brackets.

13. A motorcycle windshield assembly as defined in claim 11, which further includes gaskets disposed between said ears and said shield to assist in isolating said shield from vibration.

14. A motorcycle windshield assembly as defined in claim 11, wherein said lower portion of said shield includes a cutout portion for a headlight, said cutout portion lying between said clamping units.

15. A motorcycle windshield assembly as defined in claim 11, wherein said shield is an acrylic sheet material.

* * * * *